J. M. CORNELIUS.
DITCHING PLOW.
APPLICATION FILED OCT. 2, 1908.
935,464.
Patented Sept. 28, 1909.
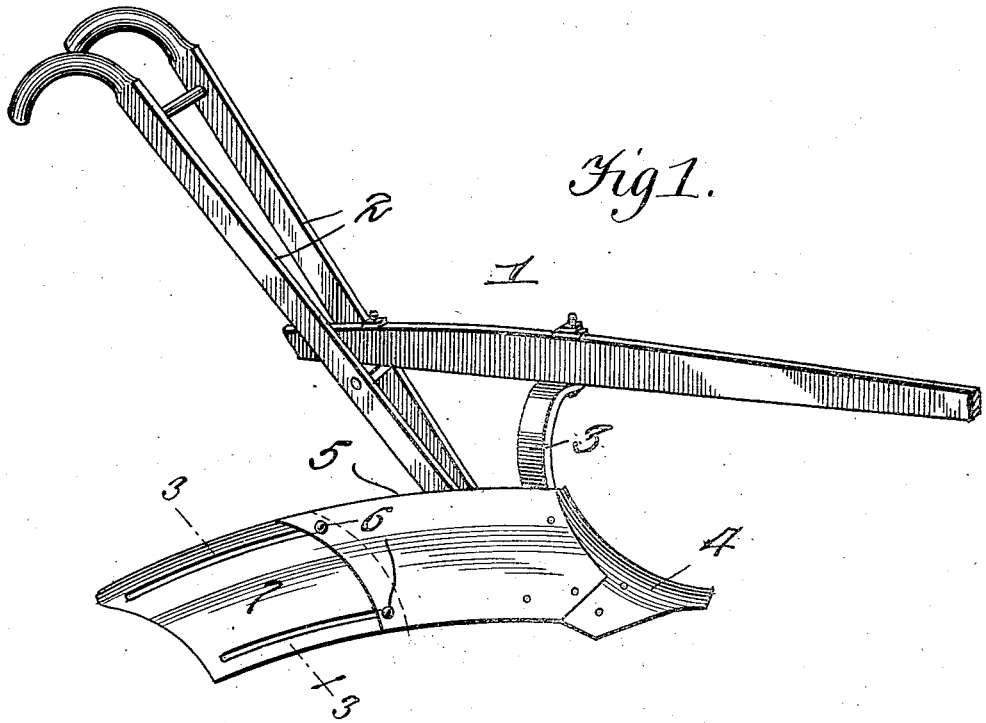
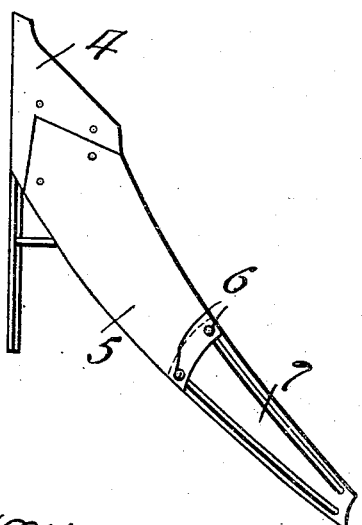
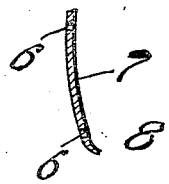
Witnesses
Inventor
Jesse M. Cornelius
By Victor J. Evans
Attorney

UNITED STATES PATENT OFFICE.

JESSE M. CORNELIUS, OF SHERRILLS FORD, NORTH CAROLINA.

DITCHING-PLOW.

935,464.  Specification of Letters Patent.  Patented Sept. 28, 1909.

Application filed October 2, 1908. Serial No. 455,789.

*To all whom it may concern:*

Be it known that I, JESSE M. CORNELIUS, a citizen of the United States, residing at Sherrills Ford, in the county of Catawba and State of North Carolina, have invented new and useful Improvements in Ditching-Plows, of which the following is a specification.

This invention relates to plows, and particularly to that class of devices known as ditching plows, and the object of the invention is to provide the mold board of the plow with an extensible wing, whereby the width of the furrow to be made by the plow may be readily and quickly regulated.

With the above and other objects in view, which will appear as the description progresses, the invention resides in the novel construction and arrangement of parts hereinafter fully described and claimed.

In the accompanying drawings I have illustrated a simple and preferred form of the device, but it is to be understood that I do not limit myself to the precise structural details therein shown, as changes and alterations within the scope of the device may be made when desired.

In the drawings,—Figure 1 is a perspective view of a plow constructed in accordance with my invention. Fig. 2 is a top plan view of a plow share showing the improvement attached. Fig. 3 is a detail cross-sectional view upon the line 3—3 of Fig. 1, and looking in the direction of the arrows.

In the drawing, the numeral 1 designates the plow beam; 2, the handles attached to the beam, and 3 the bracket supporting the share 4. The share 4 is provided with an ordinary mold board 5 of the ordinary construction in this class of plows. The mold board 5 diverges from the landside of the plow at a suitable angle toward the furrower side of the share 4, and is provided near its extremities with a pair of spaced openings adapted for the reception of securing elements 6, by which a wing extension 7 is secured to the mold board. This extension 7 has a pair of longitudinally extending slots arranged in a line with the securing elements 6 and whereby the wing may be moved laterally upon the mold board and, through the medium of the securing elements 6, retained in any desired adjusted position upon the mold board.

By reference to Fig. 3 of the drawings, it will be noted that the wing 7 is provided with an outwardly extending lower lip or cutting edge 8 which provides an easy and effective means for digging into the earth through which the plow passes.

From the above description, taken in connection with the accompanying drawings, it will be noted that I have provided an extremely simple and effective means for adjusting the width of a furrow for a ditching or other plows, one which may be easily and quickly applied to the mold board of the plow and which may be readily detached if desired.

Having thus fully described the invention, what is claimed as new is:—

In a plow, the combination with a plow share and a mold board, said mold board being provided with spaced openings, a wing extension of a width equaling that of the mold board adapted to be positioned to the rear of the mold board, said wing having a lower offset cutting edge and being provided with longitudinally extending slots adapted to aline with the openings in the mold board, and threaded bolts provided with nuts adapted to engage the openings of the mold board and the slots of the wing extension.

In testimony whereof I affix my signature in presence of two witnesses.

JESSE M. CORNELIUS.

Witnesses:
B. F. CORNELIUS,
D. L. WILKINSON.